(12) United States Patent
Yamashita (10) Patent No.: US 7,490,546 B2
(45) Date of Patent: Feb. 17, 2009

(54) IMAGE RECORDING APPARATUS

(75) Inventor: Shinsuke Yamashita, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 0 days.

(21) Appl. No.: 11/730,243

(22) Filed: Mar. 30, 2007

(65) Prior Publication Data

US 2007/0227380 A1    Oct. 4, 2007

(30) Foreign Application Priority Data

Mar. 31, 2006    (JP) ............................. 2006-097316

(51) Int. Cl.
*B41F 27/12*    (2006.01)
(52) U.S. Cl. .................... 101/409; 101/410; 101/415.1; 101/401.1
(58) Field of Classification Search ................. 101/409, 101/410, 477, 415.1, 401.1; 271/82, 277
See application file for complete search history.

(56) References Cited

U.S. PATENT DOCUMENTS

| | | | |
|---|---|---|---|
| 6,334,392 B1 * | 1/2002 | Kawada et al. ........... | 101/415.1 |
| 6,459,475 B1 | 10/2002 | Fukui | |
| 2003/0189287 A1 | 10/2003 | Fukui | |
| 2005/0264856 A1 | 12/2005 | Kitawaki et al. | |

FOREIGN PATENT DOCUMENTS

| | | |
|---|---|---|
| JP | 2001-179925 | 7/2001 |
| JP | 3595229 | 9/2004 |

OTHER PUBLICATIONS

European Search Report issued in European Patent Application No. EP 07 00 5833, mailed Aug. 21, 2007.

* cited by examiner

*Primary Examiner*—Leslie J Evanisko
(74) *Attorney, Agent, or Firm*—McDermott Will & Emery LLP (57) ABSTRACT

To record images accurately regardless of rigidity and size of a recording medium, each rear end clamp has a clamp rubber element for engaging a variable margin of the recording medium mounted peripherally of the recording drum. The margin is varied according to the rigidity of the recording medium. The margin is enlarged when the recording medium is highly rigid, and reduced when the recording medium is low in rigidity.

8 Claims, 11 Drawing Sheets

IMAGE RECORDING APPARATUS

BACKGROUND OF THE INVENTION

1. Field of the Invention

This invention relates to an image recording apparatus for recording images by rotating a recording drum with a recording medium mounted peripherally thereof.

2. Description of the Related Art

In such an image recording apparatus, the recording medium mounted peripherally of the recording drum is fixed to the peripheral surface of the recording drum by forward end clamps for fixing the forward end of the recording medium to the peripheral surface of the recording drum, and by rear end clamps for fixing the rear end of the recording medium to the peripheral surface of the recording drum.

On the other hand, in such an image recording apparatus, it is necessary to attach recording media of various sizes to the peripheral surface of the recording drum. For this purpose, the rear end clamps are constructed movable along recesses formed to extend circumferentially of the recording drum. Thus, the rear end clamps may be set to varied positions according to the lengths of recording media to be mounted peripherally of the recording drum.

In such an image recording apparatus, depending on the size of a recording medium mounted peripherally of the recording drum, an edge of the recording medium axially of the recording drum may be placed over one of the recesses extending circumferentially of the recording drum. In such a case, unless the rear end clamps apply an appropriate pressure to the recording medium, the edge of the recording medium will be lifted from the surface of the recording drum by a centrifugal force produced by rotation of the recording drum, or will yield to the pressure and sink in the recess. When such a phenomenon occurs, a laser beam emitted to the recording medium will go out of focus on the surface of the recording medium, thereby failing to record images properly.

To cope with the above situation, an image recording apparatus described in Japanese Patent No. 3595229 is constructed to adjust clamp rubber elements of rear end clamps to proper positions.

The rigidity of a recording medium to be mounted peripherally of the recording drum varies according to the type of the recording medium. Also, depending on the length of the recording medium lying over a recess formed to extend circumferentially of the recording drum, unless the rear end clamps apply to the recording medium an appropriate pressure according to that length, the edge of the recording medium will be lifted from the surface of the recording drum by a centrifugal force produced by rotation of the recording drum, or will yield to the pressure and sink in the recess. With the image recording apparatus described in the above patent No. 3,595,229, it is difficult to solve such a problem.

SUMMARY OF THE INVENTION

The object of this invention, therefore, is to provide an image recording apparatus capable of recording images accurately regardless of the rigidity and size of a recording medium.

The above object is fulfilled, according to this invention, by an image recording apparatus comprising a recording drum for supporting a recording medium mounted peripherally thereof; forward end clamps for fixing a forward end of the recording medium mounted peripherally of the recording drum, to a peripheral surface of the recording drum; and rear end clamps for fixing a rear end of the recording medium mounted peripherally of the recording drum, to the peripheral surface of the recording drum, the rear end clamps being movable along recesses formed to extend circumferentially of the recording drum; the recording medium being mounted peripherally of the recording drum, with an edge of the recording medium axially of the recording drum overhanging one of the recesses; wherein a margin of the recording medium for gripping by the rear end clamps is changeable according to one of rigidity of the recording medium mounted peripherally of the recording drum and a length of the recording medium overhanging the one of the recesses.

This image recording apparatus can record images accurately regardless of rigidity and size of the recording medium.

In a preferred embodiment, positions of the recording medium gripped by the rear end clamps are shiftable circumferentially of the recording drum according to the rigidity of the recording medium mounted peripherally of the recording drum, or the length of the recording medium overhanging the one of the recesses.

In another embodiment, an area of contact between the recording medium and the rear end clamps over the recesses is changed according to one of the rigidity of the recording medium mounted peripherally of the recording drum, and the length of the recording medium overhanging the one of the recesses.

In an image recording apparatus according to another aspect of the invention, each of the rear end clamps has an elastic element for contacting a surface of the recording medium; the elastic element having a pair of projections for contacting the recording medium over one of the recesses when the recording medium is gripped; the rear end clamps being arranged in positions where both of the projections contact the recording medium when the recording medium is highly rigid, and in positions where one of the projections contacts the recording medium when the recording medium is low in rigidity.

With this image recording apparatus, the area of contact between the rear end clamps and recording medium can be changed easily by changing the positions of gripping by the rear end clamps.

Other features and advantages of the invention will be apparent from the following detailed description of the embodiments of the invention.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Figure 1:
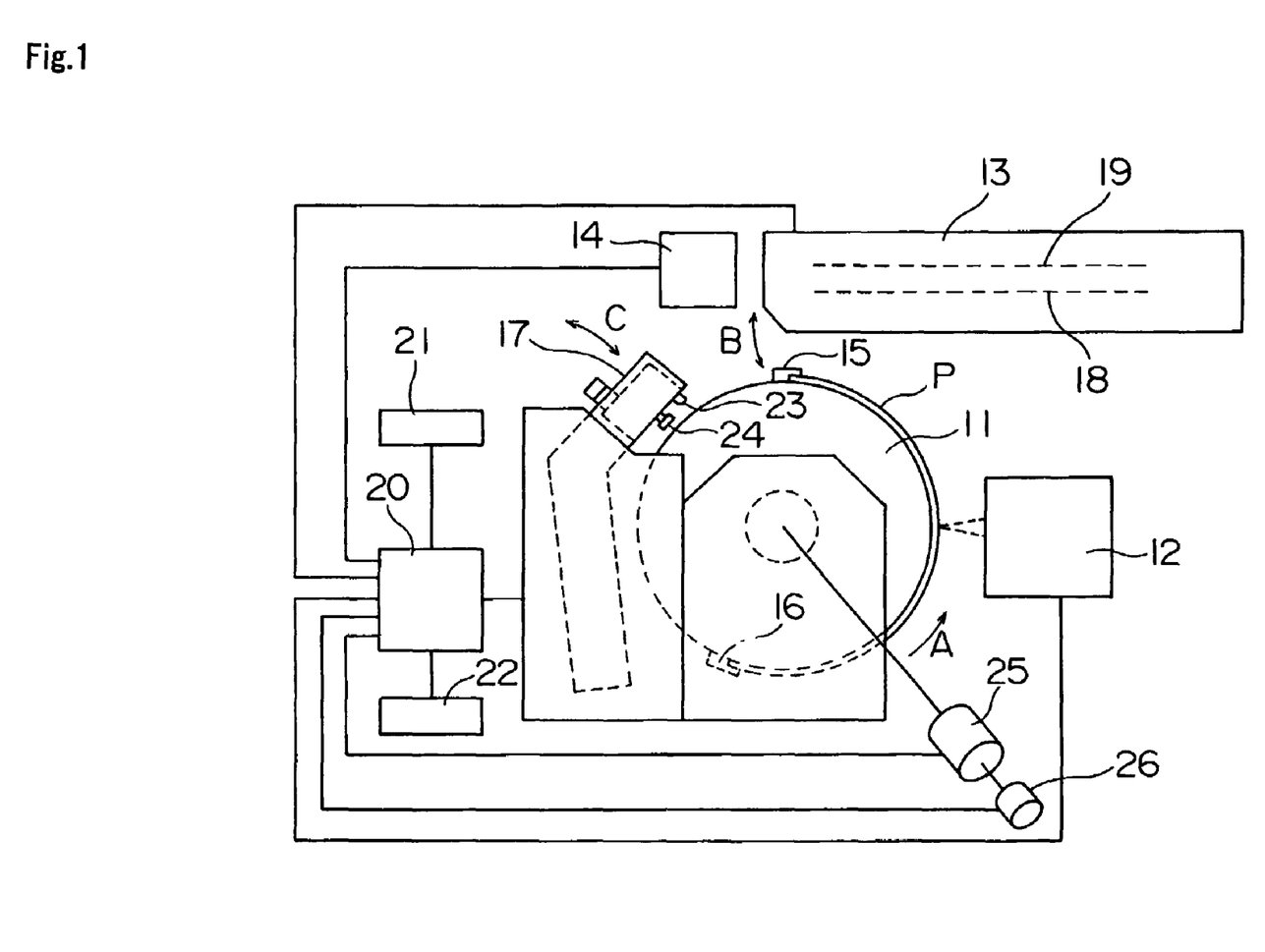
FIG. 1 is a schematic side view of an image recording apparatus according to this invention.

An embodiment of this invention will be described hereinafter with reference to the drawings. FIG. 1 is a schematic side view of an image recording apparatus according to this invention.

The image recording apparatus includes a recording drum 11 drivable by a motor 25 to rotate in a direction indicated by an arrow A in FIG. 1, with a printing plate P acting as a recording medium mounted peripherally of the drum 11, a rotary encoder 26 for detecting a rotational angular position of the recording drum 11, a recording head 12 for recording images on the printing plate P mounted on the recording drum 11, a transport unit 13 for transporting the printing plate P to the recording drum 11 and removing the printing plate P from the recording drum 11, a punch unit 14 for punching positioning holes in the printing plate P transported from the transport unit 13 toward the recording drum 11, a clamp unit 17 for opening and closing forward end clamps 15 and rear end clamps 16 arranged peripherally of the recording drum 11, and moving the rear end clamps 16 along the peripheral surface of the recording drum 11, a controller 20, an input unit 21, and a table 22 storing predetermined data. The recording drum 11 has positioning pins (not shown) erected on the peripheral surface thereof for fitting into the positioning holes to determine a forward end position of the printing plate P.

The recording head 12 opposed to the recording drum 11 has numerous laser diodes not shown. The recording head 12 records a two-dimensional image on the printing plate P mounted peripherally of the recording drum 11, by emitting laser light according to image signals outputted from the controller 20, while moving axially of the recording drum 11 (i.e. in directions perpendicular to the plane of FIG. 1) synchronously with rotation of the recording drum 11.

The transport unit 13 disposed above the recording drum 11 is tiltable as indicated by an arrow B in FIG. 1, and defines therein a transport path 18 for transporting the printing plate P to the recording drum 11 and a transport path 19 for discharging the printing plate P.

The clamp unit 17 is rockable as indicated by an arrow C in FIG. 1, and has, arranged at a distal end thereof, a forward end clamp presser 23 for opening and closing the forward end clamps 15, and a rear end clamp mounter 24 for mounting the rear end clamps 16. The rear end clamps 16 arranged peripherally of the recording drum 11 are movable along clamp grooves 30 formed in the peripheral surface of the recording drum 11 as described hereinafter. The rear end clamp mounter 24 also performs an operation to move the rear end clamps 16.

Figure 2:
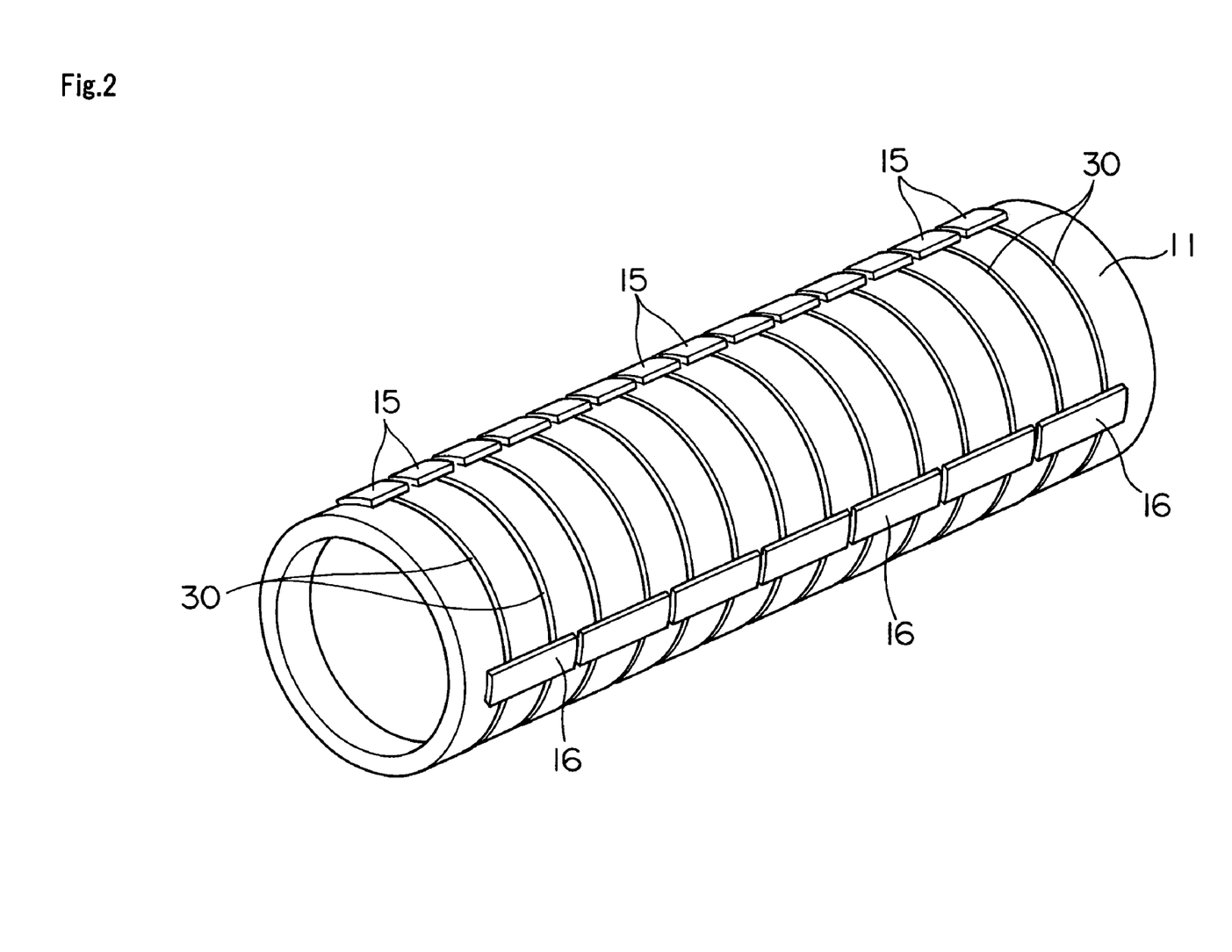
FIG. 2 is a perspective view showing a recording drum along with forward end clamps and rear end clamps.

FIG. 2 is a perspective view showing the recording drum 11 along with the forward end clamps 15 and rear end clamps 16.

The recording drum 11 has fourteen recessed clamp grooves 30 extending circumferentially thereof. The forward end clamps 15, fourteen in number, are arranged in positions corresponding to the respective clamp grooves 30. On the other hand, the rear end clamps 16 are seven in number, each bridging a pair of clamp grooves 30. The rear end clamps 16 are positionally adjustable circumferentially of the recording drum 11, along the clamp grooves 30. The rear end clamps 16 are mounted peripherally of the recording drum 11 in a required number according to the size of a printing plate P to be mounted on the recording drum 11.

Figure 3:
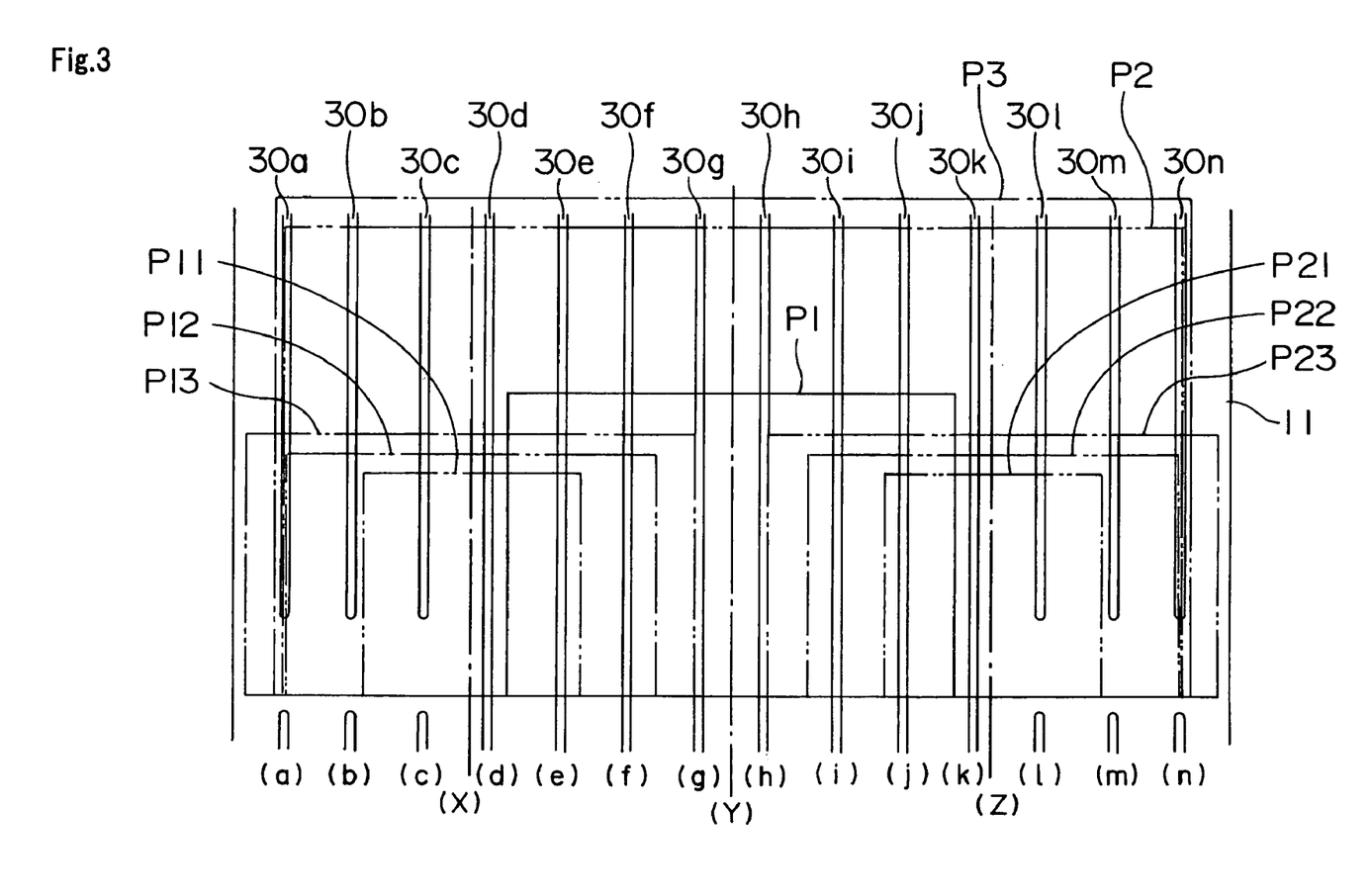
FIG. 3 is a developed view of the peripheral surface of the recording drum.

FIG. 3 is a developed view of the peripheral surface of the recording drum 11.

As seen, the recording drum 11 has fourteen clamp grooves 30a-30n formed therein (which are collectively referred to as "clamp grooves 30"). The rear end clamps 16 are fixed peripherally of the recording drum 11, respectively, by using pairs of clamp groove 30a and clamp groove 30b, clamp groove 30c and clamp groove 30d, clamp groove 30e and clamp groove 30f, clamp groove 30g and clamp groove 30h clamp grooves 30i and clamp groove 30j, clamp groove 30k and clamp groove 30l and clamp groove 30m and clamp groove 30n.

This recording drum 11 accommodates both a single-mounting mode for supporting one printing plate P and a double-mounting mode for supporting two printing plates P. In the single-mounting mode, one printing plate P is mounted peripherally of the recording drum 11, in bilateral symmetry with respect to a center line Y located in an axially middle of the recording drum 11. In the double-mounting mode, two printing plates P are mounted peripherally of the recording drum 11, each in bilateral symmetry with respect to a center line X of the left half or a center line Z of the right half of the recording drum 11.

Printing plates P having various degrees of rigidity are mounted on the recording drum 11. That is, printing plates P vary in rigidity according to different thicknesses or materials. In this image recording apparatus, printing plates P are handled as classified into two categories according to whether or not the plates P have rigidity of a predetermined value and above. That is, plates P having rigidity of the predetermined value and above are regarded as "thick plates", and those having rigidity less than the predetermined value as "thin plates". The printing plates P regarded as "thick plates" generally correspond to single-mounting plates P. The printing plates P regarded as "thin plates" generally correspond to double-mounting plates P.

However, the degrees of rigidity of printing plates P may be classified more finely. Printing plates P for single mounting, but having rigidity less than the predetermined value, may be classified as "thin plates". Printing plates P for double mounting, but having rigidity of the predetermined value and above, may be classified as "thick plates".

In FIG. 3, P1 denotes a single-mounting plate of minimum size, P2 denotes a single-mounting plate of intermediate size, and P3 denotes a single-mounting plate of maximum size. P11, P12 and P13 denote double-mounting plates of typical sizes mounted on the left half of the recording drum 11. P21, P22 and P23 denote double-mounting plates of typical sizes mounted on the right half of the recording drum 11. P11 and P21 denote double-mounting plates of minimum size, P13 and P23 those of maximum size, and P12 and P22 those of intermediate size.

This recording drum 11 has the clamp grooves 30a-30n arranged in bilateral symmetry with respect to the center line Y. That is, the pairs of clamp groove 30*a* and clamp groove 30*n*, clamp groove 30*b* and clamp groove 30*m*, clamp groove 30*c* and clamp groove 30*l*, clamp groove 30*d* and clamp groove 30*k*, clamp grooves 30*e* and clamp groove 30*j*, clamp groove 30*f* and clamp groove 30*i*, and clamp groove 30*g* and clamp groove 30*h*, respectively, are arranged in bilateral symmetry with respect to the center line Y. On the other hand, the clamp grooves 30 are not in bilateral symmetry with respect to the center line X or Z of the left or right half.

In time of double-mounting printing plates P, therefore, only one of the opposite edges in the direction of width (i.e. axially of the recording drum 11) of each plate P overhangs a clamp groove 30. For example, a plate P13 of maximum size that can be mounted in the left-hand region on the recording drum 11 will have one edge thereof overhanging the clamp groove 30*g*, while the other edge will not be present on the clamp groove 30*a*.

In this case, patterns of plates P arranged on the clamp grooves 30 can be classified into the following four patterns.

The first pattern is a case where the opposite edges of a single-mounting plate P and each double-mounting plate P are arranged on clamp grooves 30. In this case, since the single-mounting plate P generally corresponds to a thick plate P and each double-mounting plate P to a thin plate P, the edges of the thick and thin plates P are arranged on the clamp grooves 30. The second pattern is a case where only the edges of a single-mounting plate P are arranged on clamp grooves 30. In this case, the edges of a thick plate P are arranged on clamp grooves 30. The third pattern is a case where only the edges of double-mounting plates P are arranged on clamp grooves 30. In this case, the edges of thin plates P are arranged on clamp grooves 30. The fourth pattern is a case where the edges of plates P are not arranged on clamp grooves 30.

Plates P may be mounted over the above clamp grooves 30*a*, 30*b*, 30*m* and 30*n* in the state of the first pattern. Plates P may be mounted over the clamp grooves 30*c*, 30*d*, 30*k* and 30*l* in the state of the second pattern. Plates P may be mounted over the clamp grooves 30*f* and 30*i* in the state of the third pattern. Further, the edges of plates P are not arranged over the clamp groove 30*e*, 30*g*, 30*h* or 30*j*.

Thus, the edges of thick and thin plates P may be arranged over the clamp grooves 30*a*, 30*b*, 30*m* and 30*n*. Therefore, when the edges of plates P are arranged over these clamp grooves 30, the margin of each such plate P for gripping by the rear end clamps 16, for example, is changed according to whether it is a thick plate P or a thin plate P. Only the edges of a single-mounting plate P can overlap the clamp grooves 30*c*, 30*d*, 30*k* and 30*l*, and only the edges of double-mounting plates P can overlap the clamp grooves 30*f* and 30*i*.

Figure 4A:
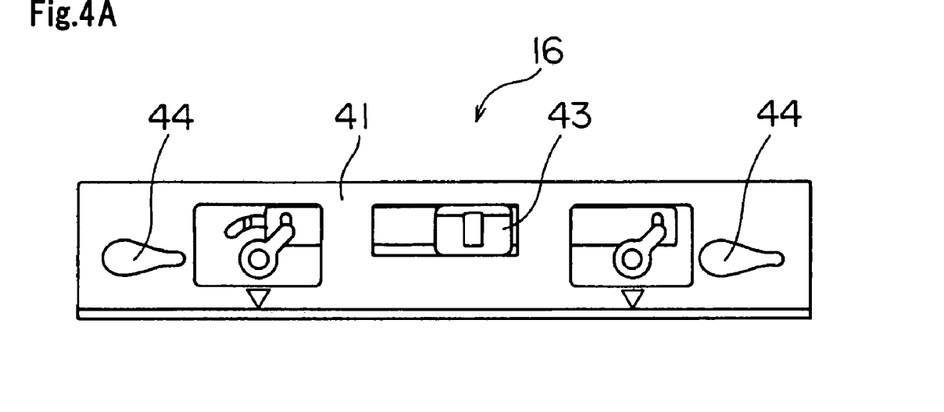
FIG. 4A is a schematic view of a rear end clamp.
Figure 4B:
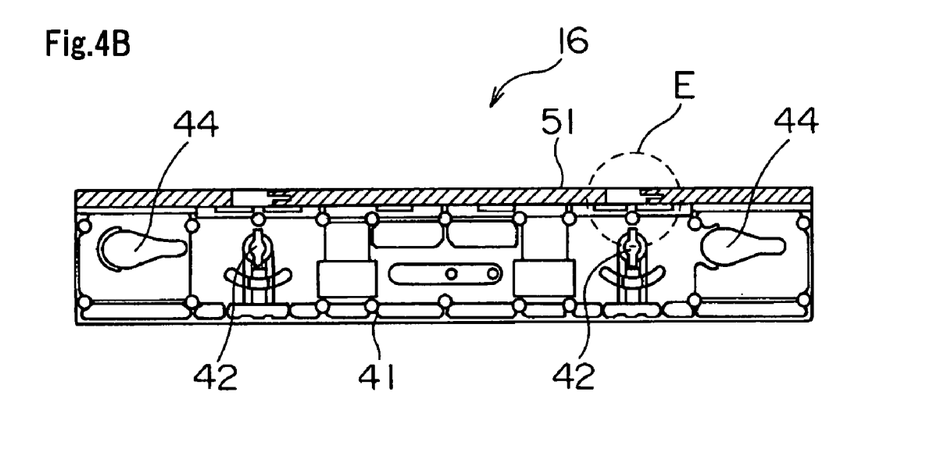
FIG. 4B is a schematic view of the rear end clamp.
Figure 5A:
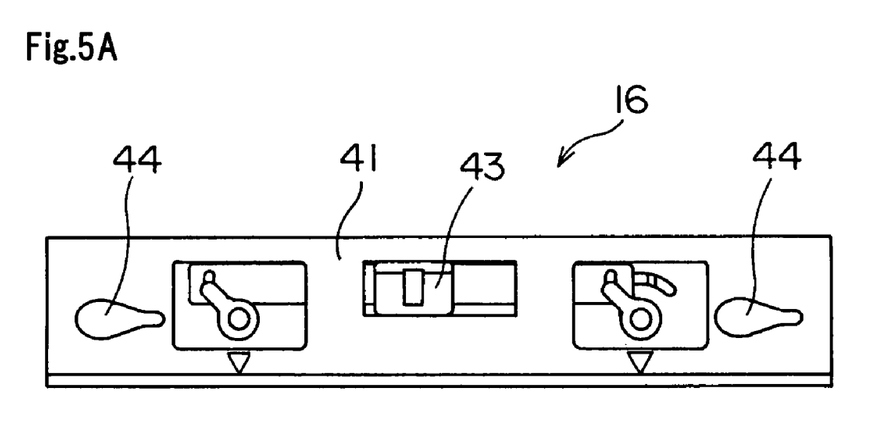
FIG. 5A is a schematic view of the rear end clamp.
Figure 5B:
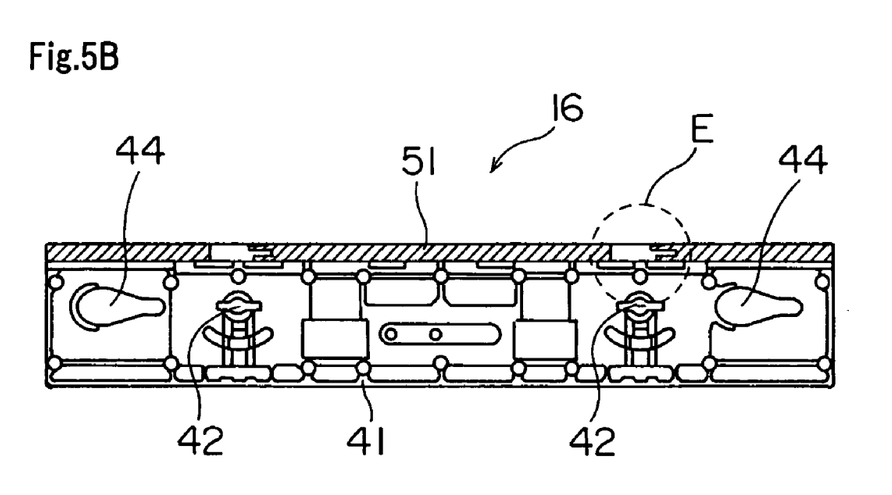
FIG. 5B is a schematic view of the rear end clamp.

Next, the construction of the rear end clamps 16 will be described. FIGS. 4A, 4B, 5A and 5B are schematic views of one rear end clamp 16. FIGS. 4A and 4B show the rear end clamp 16 being detached from the recording drum 11. FIGS. 5A and 5B show the rear end clamp 16 being attached to the recording drum 11. FIGS. 4A and 5A are top views, and FIGS. 4B and 5B bottom views.

As shown in these figures, the rear end clamp 16 has a main body 41, a pair of clamping bolts 42 for engaging with clamp grooves 30 of the recording drum 11, and a drive block 43 for operating the clamping bolts 42. The main body 41 has bores 44 formed therein for engaging with holding pins of the rear end clamp mounter 24 shown in FIG. 1.

Each clamping bolt 42 has projections formed at opposite ends thereof for engaging with a clamp groove 30. The drive block 43 is driven by an operating pin of the rear end clamp mounter 24 to turn the clamping bolts 42 between an unlock state shown in FIG. 4 where the projections of the clamping bolts 42 extend parallel to the direction of extension of the clamp groove 30, and a lock state shown in FIG. 5 where the projections of the clamping bolts 42 extend perpendicular to the direction of extension of the clamp groove 30.

Figure 6A:
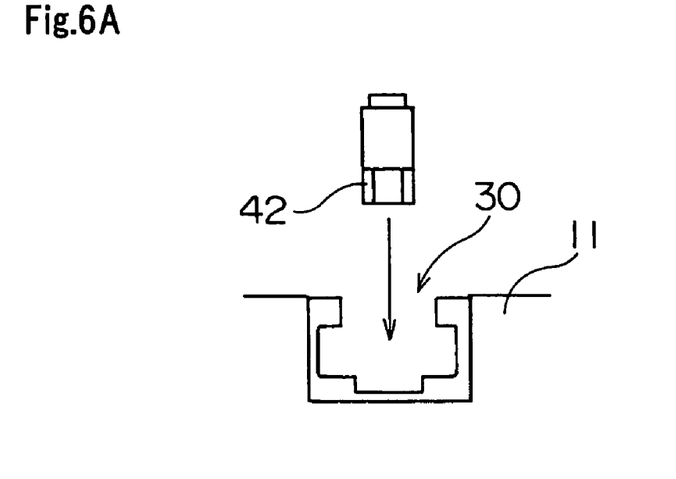
FIG. 6A is a schematic view showing a relationship between a clamping bolt and a clamp groove.
Figure 6B:
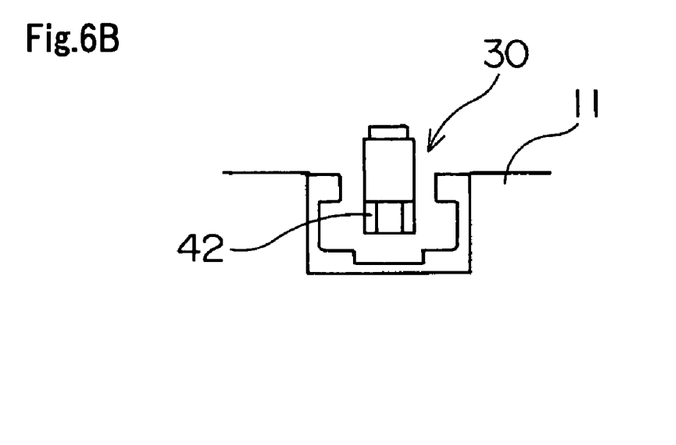
FIG. 6B is a schematic view showing the relationship between the clamping bolt and clamp groove.
Figure 6C:
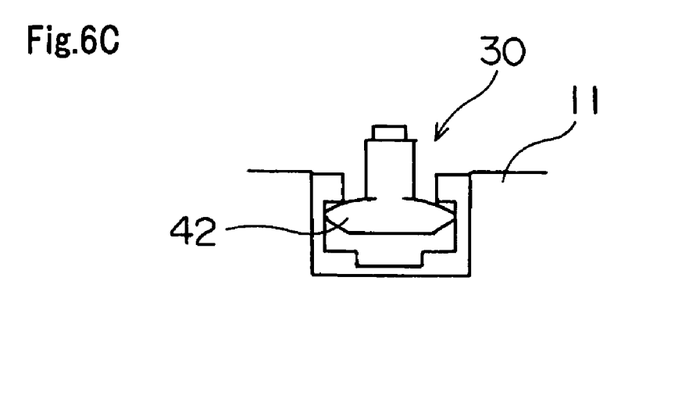
FIG. 6C is a schematic view showing the relationship between the clamping bolt and clamp groove.

FIGS. 6A, 6B and 6C are schematic views showing a relationship between a clamping bolt 42 and a clamp groove 30 in time of fixing the rear end clamp 16 to the recording drum 11.

First, as shown in FIG. 6A, the recording drum 11 is rotated while the rear end clamp 16 is held by the rear end clamp mounter 24 shown in FIG. 1, to place the clamping bolts 42 of the rear end clamp 16 over the clamp grooves 30. At this time, each clamping bolt 42 is in the unlock state shown in FIGS. 4A and 4B.

In this state, as shown in FIG. 6B, the rear end clamp mounter 24 advances each clamping bolt 42 into the clamp groove 30.

Subsequently, as shown in FIG. 6C, the clamping bolt 42 is turned to the lock state where the projections of the clamping bolt 42 extend in the direction perpendicular to the direction of extension of the clamp groove 30. As a result, the rear end clamp 16 is fixed to the surface of the recording drum 11.

The main body 41 of each rear end clamp 16 has a clamp rubber element 51 secured by an adhesive or the like to a back surface of a forward end thereof in the direction of drum rotation, for pressing and fixing a plate P to the peripheral surface of the recording drum 11. The clamp rubber element 51 has a different shape according to the clamp groove 30 to which the rear end clamp 16 is attached. Specifically, a different rear end clamp 16 has a different shape in the portion, opposed to the clamp groove 30, of the clamp rubber element 51 shown in circle E in FIGS. 4B and 5B.

Figure 7A:
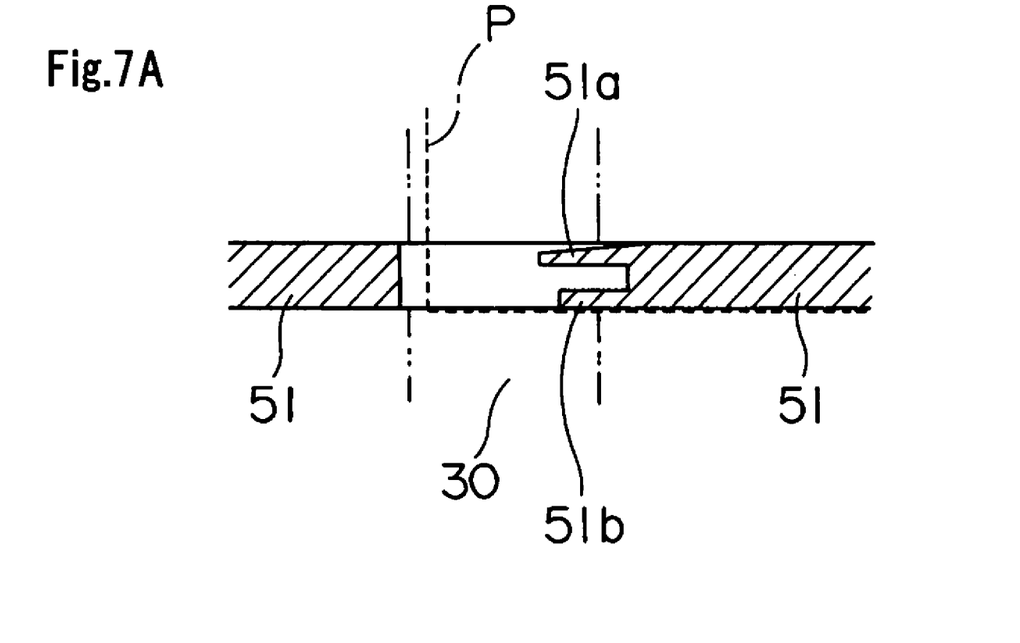
FIG. 7A is an explanatory view showing a clamp rubber element of a rear end clamp for fixing single-mounting and double-mounting plates.
Figure 7B:
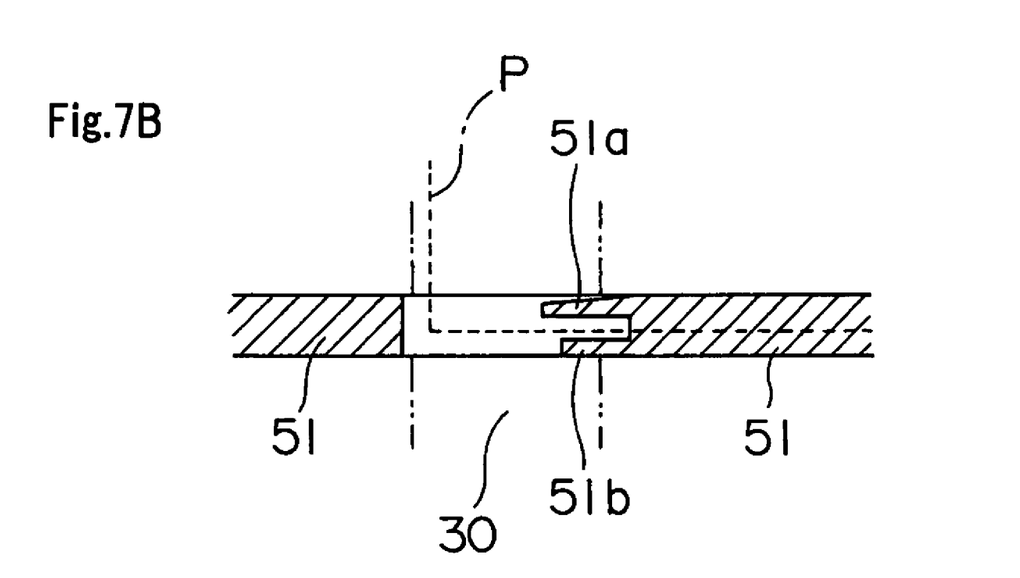
FIG. 7B is an explanatory view showing the clamp rubber element of the rear end clamp for fixing single-mounting and double-mounting plates.
Figure 8A:
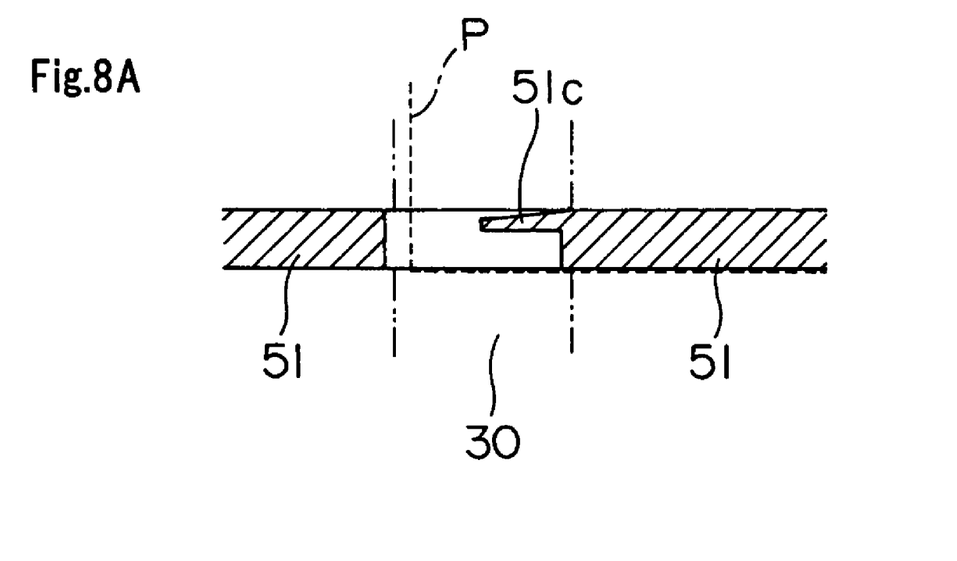
FIG. 8A is an explanatory view showing a clamp rubber element of a rear end clamp for fixing single-mounting and double-mounting plates.
Figure 8B:
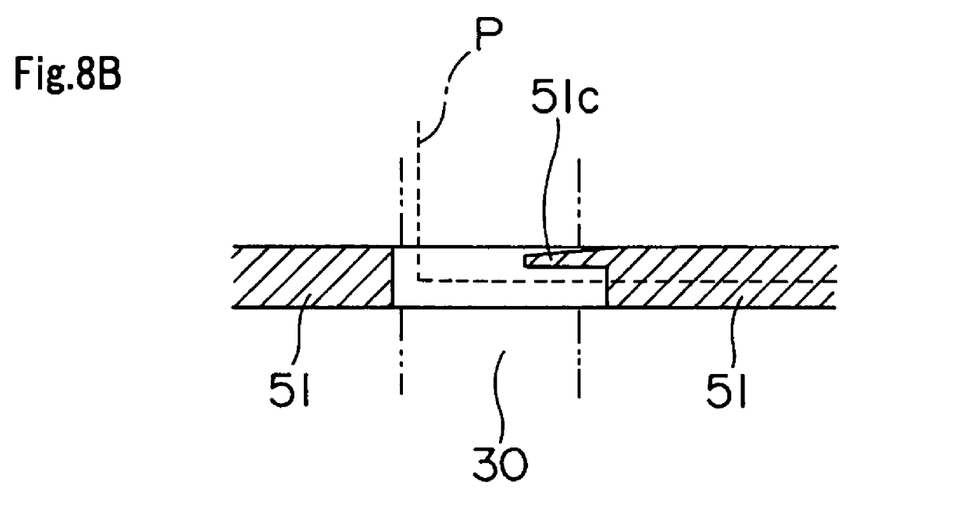
FIG. 8B is an explanatory view showing the clamp rubber element of the rear end clamp for fixing single-mounting and double-mounting plates.

FIGS. 7A and 7B are explanatory views showing a clamp rubber element 51 of a rear end clamp 16 for fixing single-mounting and double-mounting plates P. FIGS. 8A and 8B are explanatory views showing a clamp rubber element 51 of a rear end clamp 16 for fixing a single-mounting or double-mounting plate P.

As noted hereinbefore, the edges of thick and thin plates P may be arranged over the clamp grooves 30*a*, 30*b*, 30*m* and 30*n*. On the other hand, only the edges of a single-mounting plate P can overlap the clamp grooves 30*c*, 30*d*, 30*k* and 30*l*, and only the edges of double-mounting plates P can overlap the clamp grooves 30*f* and 30*i*.

Thus, rear end clamps 16 placed opposite the clamp grooves 30*a*, 30*b*, 30*m* and 30*n* use the clamp rubber element 51 shown in FIGS. 7A and 7B, so that changes may be made in the area of contact between the plate P and the clamp rubber element 51 of the rear end clamps 16 over the clamp grooves 30. Rear end clamps 16 placed opposite the clamp grooves 30*c*, 30*d*, 30*k* and 30*l* and rear end clamps 16 placed opposite the clamp grooves 30*f* and 30*i* use the clamp rubber element 51 shown in FIGS. 8A and 8B. As shown in FIGS. 8A and 8B, the rear end clamps 16 shown in FIG. 8A may grip positions different in the axial direction of the recording drum 11 from positions gripped by the rear end clamps 16 shown in FIG. 8B.

Specifically, as shown in FIGS. 7A and 7B, the clamp rubber element 51 of the rear end clamps 16 placed opposite the clamp grooves 30*a*, 30*b*, 30*m* and 30*n* has a pair of projections 51*a* and 51*b* that project over the clamp grooves 30. When a thick plate P of high rigidity is used, as shown in FIG. 7A, the rear end clamp 16 is placed in a position where an end of the clamp rubber element 51 is slightly spaced from the rear end of the plate P, to set a large margin for gripping by the clamp rubber element 51 of the rear end clamp 16. In this case, the plate P contacts both of the projections 51*a* and 51*b* of the clamp rubber element 51 over the clamp groove 30, thereby providing a large area of contact between the plate P and the clamp rubber element 51 of the rear end clamp 16 over the clamp groove 30.

On the other hand, when a thin plate P of low rigidity is used, as shown in FIG. 7B, the rear end clamps 16 opposite the clamp grooves 30a, 30b, 30m and 30n are placed in a position where an approximately middle portion of the clamp rubber element 51 coincides with the rear end of the plate P, to set a small margin for gripping by the clamp rubber element 51 of the rear end clamp 16. In this case, the plate P contacts only the projection 51a of the clamp rubber element 51 over the clamp groove 30, thereby providing a small area of contact between the plate P and the clamp rubber element 51 of the rear end clamp 16 over the clamp groove 30.

As opposed to the above, rear end clamps 16 placed opposite the clamp grooves 30c, 30d, 30k and 30l are used for fixing a thick plate P of high rigidity. In this case, as shown in FIG. 8A, a clamp rubber element 51 having a projection 51c is used. This clamp rubber element 51 has a gripping position set axially of the recording drum 11 so that the entire region of the projection 51c may be disposed over a clamp groove 30. As shown in FIG. 8A, the rear end clamp 16 is placed in a position where an end of the clamp rubber element 51 is slightly spaced from the rear end of the plate P, to set a large margin for gripping by the clamp rubber element 51 of the rear end clamp 16.

Rear end clamps 16 placed opposite the clamp grooves 30f and 30i are used for fixing plates P of low rigidity. In this case, as shown in FIG. 8B, the clamp rubber element 51 having the projection 51c is used. This clamp rubber element 51 has a gripping position set axially of the recording drum 11 so that only part of the projection 51c may be disposed over a clamp groove 30. Further, as shown in FIG. 8B, the rear end clamp 16 is placed in a position where an approximately middle portion of the clamp rubber element 51 coincides with the rear end of the plate P, to set a small margin for gripping by the clamp rubber element 51 of the rear end clamp 16.

As noted hereinbefore, the clamping rubber element 51 shown in FIGS. 7A and 7B has a pair of projections 51a and 51b spaced a predetermined distance apart circumferentially of the recording drum 11. Thus, even when a thin plate P is used and an error occurs in a stopping position of the recording drum 11, a constant contact area between the plate P and clamp rubber element 51 over the clamp groove 30 is secured as long as the edge of the plate P is disposed between the projections 51a and 51b. Therefore, even with a slight error in the mounting position of the rear end clamp 16, it is possible to secure a constant contact area between the plate P and clamp rubber element 51 over the clamp groove 30.

Figure 9:
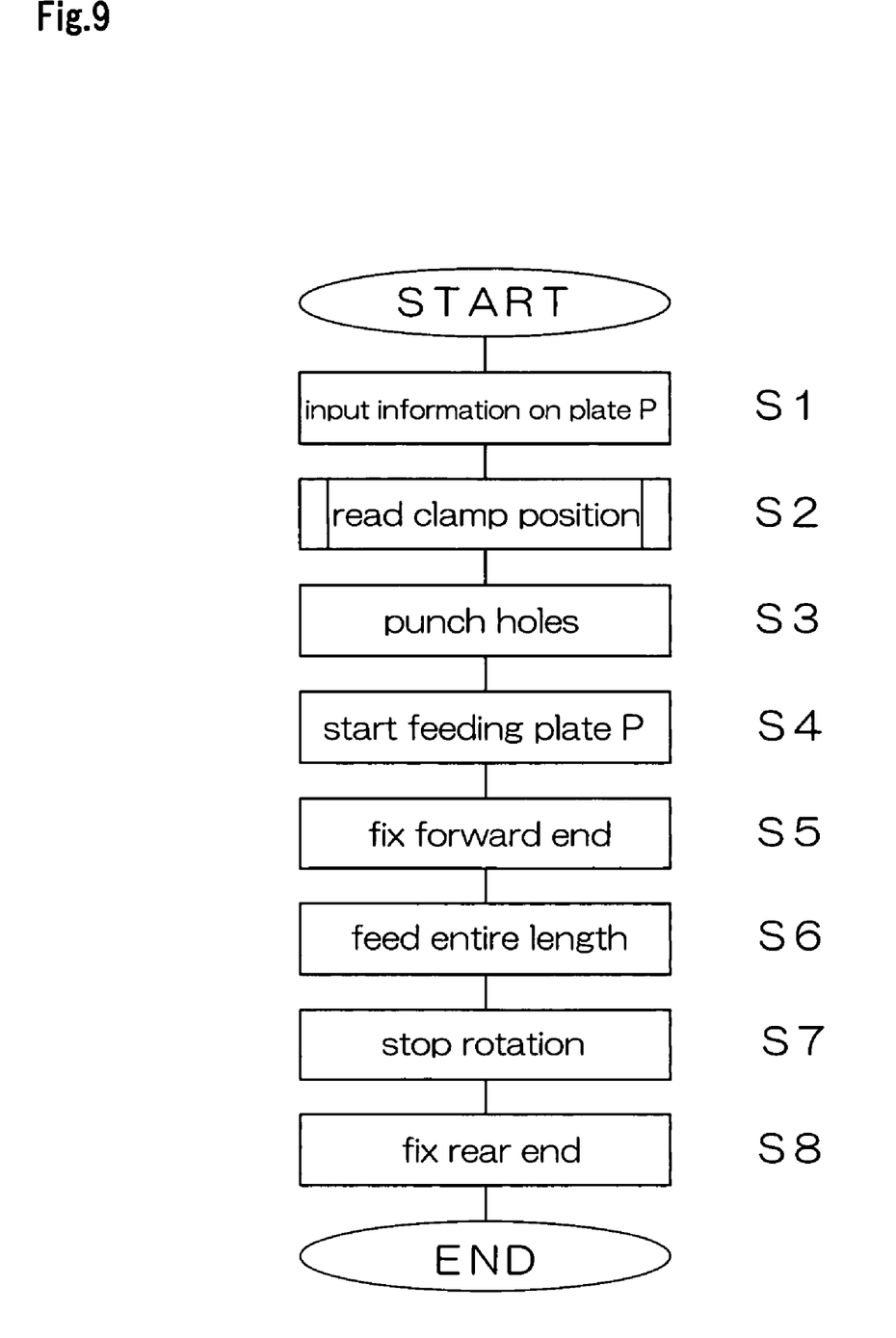
FIG. 9 is a flow chart of a plate mounting operation.

Next, operation of the above image recording apparatus for mounting a printing plate P on the recording drum 11 will be described. FIG. 9 is a flow chart of the plate mounting operation.

First, information on the plate P is inputted (step S1). This information indicates a size of the plate P and whether this plate P is a thick plate or thin plate. This information is inputted from the input unit 21 shown in FIG. 1.

Figure 10:
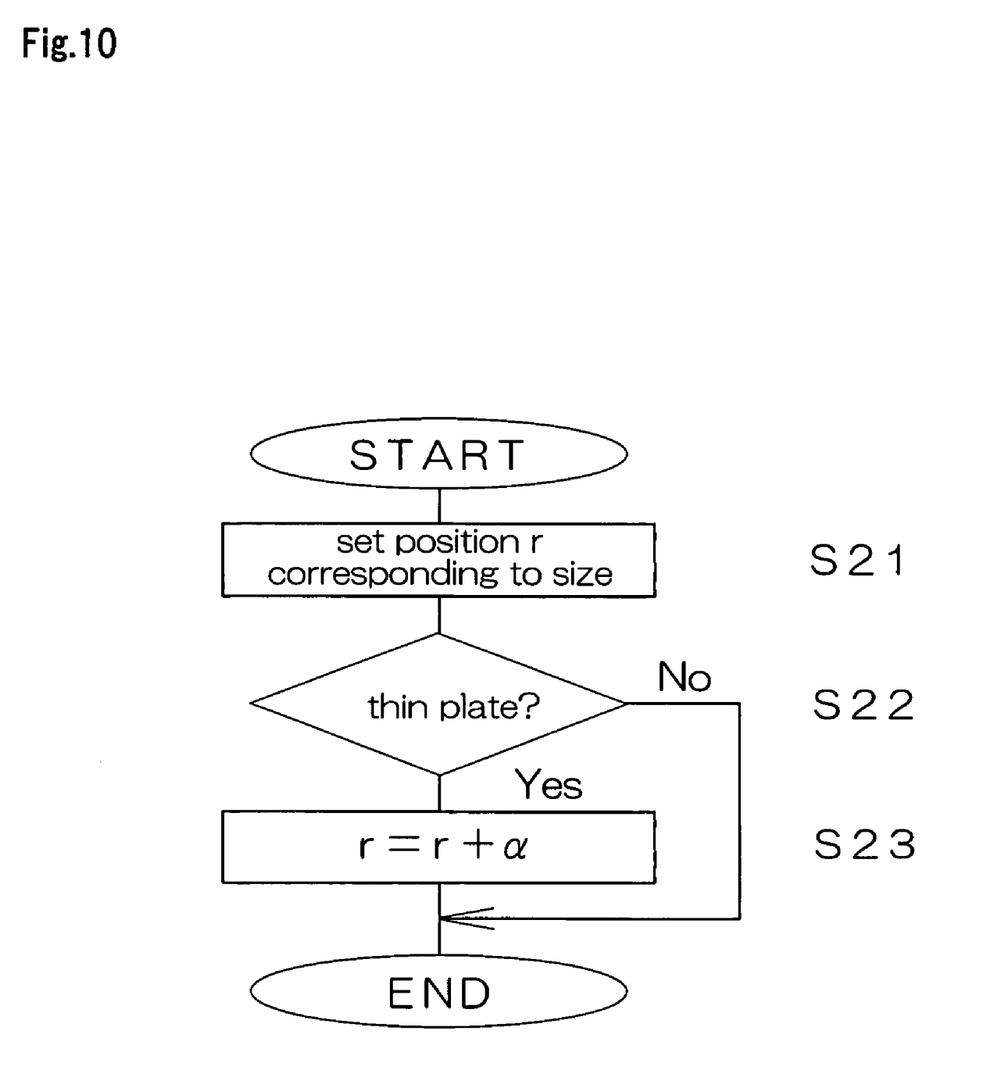
FIG. 10 is a flow chart of a clamp position reading operation.

Next, the controller 20 shown in FIG. 1 reads a position of the rear end clamps 16 (step S2). FIG. 10 is a flow chart of this clamp position reading operation.

When reading a clamp position, a clamp position r corresponding to the size of plate P is set first (step S21). This clamp position r is a position corresponding to a thick plate P, which allows the plate P to be gripped by a large gripping margin. The clamp position r is a position expressed as a distance from a predetermined reference position circumferentially of the recording drum 11, which is expressed, for example, as a length measured from the forward end clamps 15 counterclockwise in FIG. 1, along the peripheral surface of the recording drum 11. Alternatively, the clamp position r is expressed as a rotational angular position of the recording drum 11, in which the counterclockwise direction of the recording drum 11 in FIG. 1 is regarded as positive. This clamp position r is stored beforehand in the table 22 shown in FIG. 1.

Next, it is determined whether the plate P to be mounted is a thin plate (step S22). When the plate P is not a thin plate but a thick plate, this subroutine is ended with no further action. On the other hand, when the plate P to be mounted is a thin plate, an amount of correction α is added to r, to shift the clamp position by the amount of correction α counterclockwise on the recording drum 11, to a position for gripping the plate P by a small gripping margin (step S23).

Referring to FIG. 9 again, the plate P is fed out of the transport path 19 of the transport unit 13 shown in FIG. 1, and the punch unit 14 punches positioning holes in the plate P (step S3). The punched plate P is fed toward the recording drum 11 (step S4).

When the forward end of the plate P reaches the position of the forward end clamps 15 on the recording drum 11, the forward end clamp presser 23 of the clamp unit 17 opens and closes the forward end clamps 15 to fix the forward end of the plate P to the recording drum 11 (step S5). Then, the motor 25 rotates the recording drum 11, to apply the entire length of the plate P to the peripheral surface of the recording drum 11 (step S6). Rotational angular positions of the recording drum 11 at this time are constantly monitored by the rotary encoder 26.

When the recording drum 11 has rotated to a rotational angular position where rear end clamps 16 can grip the rear end of the plate P by a gripping margin set beforehand, the rotation of the recording drum 11 is stopped (step S7). Then, the rear end clamp mounter 24 of the clamp unit 17 attaches the rear end clamps 16 to the recording drum 11, thereby attaching the rear end of the plate P to the recording drum 11 (step S8).

When the plate P mounted peripherally of the recording drum 11 is a thick plate, the clamp rubber element 51 of each of the rear end clamps 16 placed opposite the clamp grooves 30a, 30b, 30m and 30n presses the plate P in the state shown in FIG. 7A, and the clamp rubber element 51 of each of the rear end clamps 16 placed opposite the clamp grooves 30c, 30d, 30k and 30l presses the plate P in the state shown in FIG. 8A.

When the plate P mounted peripherally of the recording drum 11 is a thin plate, the clamp rubber element 51 of each of the rear end clamps 16 placed opposite the clamp grooves 30a, 30b, 30m and 30n presses the plate P in the state shown in FIG. 7B, and the clamp rubber element 51 of each of the rear end clamps 16 placed opposite the clamp grooves 30c, 30d, 30k and 30l presses the plate P in the state shown in FIG. 8B.

Figure 11:
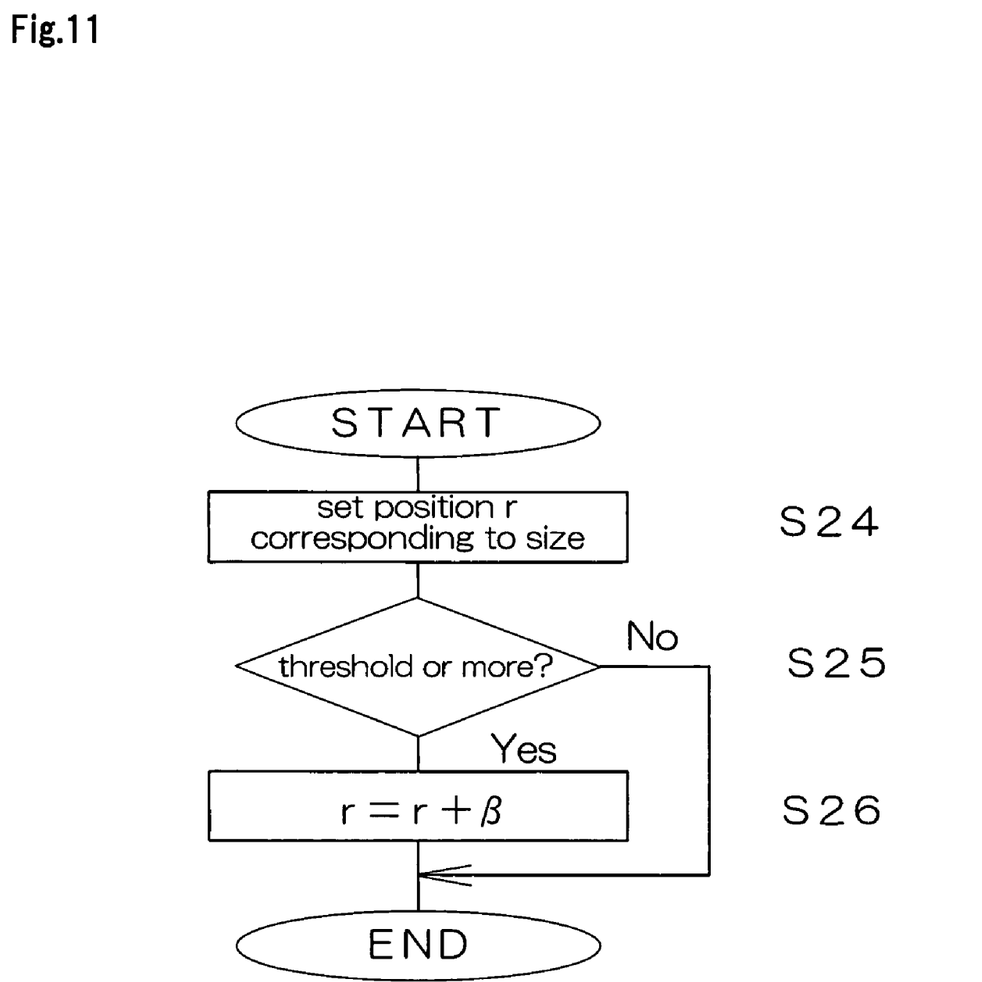
FIG. 11 is a flow chart of another clamp position reading operation.

Next, another embodiment of this invention will be described. FIG. 11 is a flow chart of a clamp position reading operation according to another embodiment.

In the foregoing embodiment, when the plate P is a thick plate, a large margin for gripping by the rear end clamps 16 is provided to compensate for an insufficient pressing force due to the rigidity of the plate P. In this embodiment, on the other hand, when a large length of plate P overhangs a clamp groove 30, a margin for gripping by the rear end clamps 16 is reduced in order to prevent the plate P from sinking in the clamp groove 30. This embodiment is different from the foregoing first embodiment only in the clamp position reading step (step S2) of the plate mounting operation shown in FIG. 9.

As shown in FIG. 11, when reading a clamp position in this embodiment, a clamp position r corresponding to the size of plate P is set first (step S24). This clamp position r is a position corresponding to a case where a relatively small length of plate P overhangs the clamp groove 30, which allows the plate P to be gripped by a large gripping margin. This clamp position r is stored beforehand in the table 22 shown in FIG. 1.

Next, it is determined whether the plate P overhangs the clamp groove 30 by a length equal to or more than a threshold (step S25). The threshold has different values set beforehand whether the plate P to be mounted peripherally of the recording drum 11 is a thick plate or thin plate. The threshold values are stored beforehand in the table 22 shown in FIG. 1.

When the plate P overhangs the clamp groove 30 by a length equal to or larger than a threshold, an amount of correction β is added to r, to shift the clamp position by the amount of correction β clockwise on the recording drum 11, to a position for gripping the plate P by a small gripping margin (step S26).

In both of the foregoing embodiments, the margin of the plate P for gripping by the rear end clamps 16 is changed by changing the mounting position of the rear end clamps 16 on the recording drum 11, that is by changing the position of the plate P gripped by the rear end clamps 16. Alternatively, the positional relationship between the rear end of the plate P and the rear end clamps 16 may be changed by shifting the mounting position of the plate P circumferentially of the recording drum 11 according to the rigidity or width of the plate P, or the length of the plate P overhanging a clamp groove 30. If, for example, positions of the positioning holes for engaging with the positioning pins erected on the peripheral surface of the recording drum 11 or a plate edge distance of the positioning holes are/is changed circumferentially of the recording drum 11, the positional relationship between the rear end of the plate P and the rear end clamps 16 can be changed without changing the mounting position of the rear end clamps 16, thereby to adjust the gripping margin of the plate P.

In the foregoing embodiments, the size of the gripping margin is changed according to whether the plate P to be mounted on the recording drum 11 is a thick plate or thin plate, or whether the plate P overhangs a clamp groove 30 by a large length or small length. The gripping margin may be changed by taking both criteria into account.

This invention may be embodied in other specific forms without departing from the spirit or essential attributes thereof and, accordingly, reference should be made to the appended claims, rather than to the foregoing specification, as indicating the scope of the invention.

This application claims priority benefit under 35 U.S.C. Section 119 of Japanese Patent Application No. 2006-097316 filed in the Japanese Patent Office on Mar. 31, 2006, the entire disclosure of which is incorporated herein by reference.

What is claimed is:

1. An image recording apparatus comprising:
   a recording drum for supporting a recording medium mounted peripherally thereof;
   forward end clamps for fixing a forward end of the recording medium mounted peripherally of said recording drum, to a peripheral surface of said recording drum; and
   rear end clamps for fixing a rear end of the recording medium mounted peripherally of said recording drum, to the peripheral surface of said recording drum, said rear end clamps being movable along recesses formed to extend circumferentially of said recording drum;
   said recording medium being mounted peripherally of said recording drum, with an edge of said recording medium axially of said recording drum overhanging one of said recesses;
   wherein a margin of the recording medium for gripping by said rear end clamps is changeable according to one of rigidity of the recording medium mounted peripherally of said recording drum and a length of the recording medium overhanging said one of said recesses;
   wherein positions of the recording medium gripped by said rear end clamps are shiftable circumferentially of said recording drum according to one of the rigidity of the recording medium mounted peripherally of said recording drum and the length of the recording medium overhanging said one of said recesses;
   wherein an area of contact between the recording medium and said rear end clamps over said recesses is changed according to one of the rigidity of the recording medium mounted peripherally of said recording drum, and the length of the recording medium overhanging said one of said recesses; and
   wherein the area of contact between the recording medium and said rear end clamps over said recesses is reduced when the recording medium overhangs said one of said recesses by a large length.

2. An image recording apparatus as defined in claim 1, wherein:
   each of said rear end clamps has an elastic element for contacting a surface of the said recording medium;
   said elastic element having a pair of projections for contacting the recording medium over one of said recesses when the recording medium is gripped;
   said rear end clamps being arranged in positions where both of said projections contact the recording medium when the recording medium is highly rigid, and in positions where one of said projections contacts the recording medium when the recording medium is low in rigidity.

3. An image recording apparatus as defined in claim 2, wherein said pair of projections are spaced apart by a predetermined distance circumferentially of said recording drum.

4. An image recording apparatus as defined in claim 1, wherein:
   each of said rear end clamps has an elastic element for contacting a surface of the said recording medium;
   said elastic element having a pair of projections for contacting the recording medium over one of said recesses when the recording medium is gripped;
   said rear end clamps being arranged in positions where one of said projections contacts the recording medium when the recording medium overhangs said one of said recesses by a large length, and in positions where both of said projections contact the recording medium when the recording medium overhangs said one of said recesses by a small length.

5. An image recording apparatus as defined in claim 4, wherein said pair of projections are spaced apart by a predetermined distance circumferentially of said recording drum.

6. An image recording apparatus comprising:
   a recording drum provided with circumferentially extending clamp grooves for supporting a recording medium mounted peripherally on said drum; and
   forward end clamps and rear end clamps for fixing the forward end and the rear end, respectively, of the recording medium with an edge of said recording medium axially of said recording drum overhanging one of said clamp grooves;

wherein said rear end clamps are movable along said clamp grooves according to one of the rigidity of the recording medium and the length of the recording medium overhanging said one of said clamp grooves, and grip the recording medium with a margin according to one of the rigidity of the recording medium and the length of the recording medium overhanging said one of said clamp grooves;

wherein each of said rear clamps has an elastic element for contacting a surface of said recording medium, said elastic elements having a pair of projections for contacting the recording medium over one of said clamp grooves when the recording medium is gripped; and wherein one or both of said projections being selected in said elastic elements to apply pressure according to one of rigidity of the recording medium or the length of the recording medium overhanging said one of said clamp grooves.

7. The image recording apparatus as defined in claim 6, wherein said rear end clamps are arranged in positions where both of said projections contact the recording medium when the recording medium is highly rigid, and in positions where one of said projections contacts the recording medium when the recording medium is low in rigidity.

8. The image recording apparatus as defined in claim 6, wherein said rear end clamps are arranged in positions where one of said projections contact the recording medium when the recording medium overhangs said one of said clamp grooves by a large length, and in positions where both of said projections contact the recording medium when the recording medium overhangs one of said clamp grooves by a small length.

\* \* \* \* \*